US007330565B1

(12) United States Patent
Der (10) Patent No.: US 7,330,565 B1
(45) Date of Patent: Feb. 12, 2008

(54) SCALE INSENSITIVE VEHICLE DETECTION ALGORITHM FOR FLIR IMAGERY

(75) Inventor: Sandor Zoltan Der, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 663 days.

(21) Appl. No.: 10/372,340

(22) Filed: Feb. 25, 2003

Related U.S. Application Data

(60) Provisional application No. 60/359,378, filed on Feb. 26, 2002.

(51) Int. Cl.
*G06K 9/00* (2006.01)
(52) U.S. Cl. ............... 382/103; 348/169; 340/933; 356/3
(58) Field of Classification Search ............... 382/100, 382/103, 104, 106, 107; 356/3; 340/933; 348/169
See application file for complete search history.

(56) References Cited

U.S. PATENT DOCUMENTS 5,825,921 A * 10/1998 Dulong ..................... 382/181

OTHER PUBLICATIONS

S. Der, "Analysis of Uncooled FLIR Data using a Scale Insensitive Detection☐☐Algorithm", ARL Technical Reoprt, 2001.*
Firooz A. Sadjadi, "Automatic Target Recognition XI", Proceedings of SPIE, 17-20 Spril☐☐2001, vol. 4379, p. 112-123.*
J. Ratches et al, "Aided and Automatic Target Recognition Based Upon Sensory Inputs from Image Forming Systems", IEEE Transactions on Pattern Analysis and Machine Intelligence, Sep. 1997.
B. Bhanu, "Automatic Target Recognition: State of the Art Survey", IEEE Transactions on Aerospace and Electronic Systems, Jul. 1986.
S. Der, C. Dwan, A. Chan, H. Kwon, N. Nasrabadi, "Scale Insensitive Vehicle Detection in Infrared Imagery", ARL Technical Report, ARL-TN-175, 2000.
S. Der, "Analysis of Uncooled FLIR Data using a Scale Insensitive Detection Algorithm", ARL Technical Reoprt, 2001.
Firooz A. Sadjadi, "Automatic Target Recognition XI", Proceedings of SPIE, 17-20 Spril 2001, vol. 4379, p. 112-123.
M. Roth, "Survey of Neural Network Technology for Automatic Target Recognition", IEEE Transactions on Neural Networks, Mar. 1990.

* cited by examiner

*Primary Examiner*—Bhavesh M Mehta
*Assistant Examiner*—Anand Bhatnagar
(74) *Attorney, Agent, or Firm*—Edward L. Stolarun; A. David Spevack (57) ABSTRACT

An algorithm for the detection of military vehicles in FLIR imagery is used as a prescreener to eliminate large areas of the image from further analysis. The output is a list of likely target locations with confidence numbers, which may be sent to a more complex clutter rejection algorithm for analysis. The algorithm uses simple features, and is intended to be applicable to a wide variety of target-sensor geometries, sensor configurations, and applications.

30 Claims, 8 Drawing Sheets

Figure 8

SCALE INSENSITIVE VEHICLE DETECTION ALGORITHM FOR FLIR IMAGERY

CROSS-REFERENCE TO RELATED APPLICATIONS

The present application claims priority from Provisional U.S. Patent Application No. 60/359,378 filed on Feb. 26, 2002, which is incorporated herein by reference in its entirety.

STATEMENT OF GOVERNMENT INTEREST

The invention described herein may be manufactured and used by or for the United States Government for governmental purposes without the payment of any royalties thereon.

FIELD OF THE INVENTION

The present invention relates to an algorithm for the detection of targets in FLIR imagery. In particular, the present invention is directed toward a an algorithm used as a pre-screener to eliminate large areas of the image from further analysis.

BACKGROUND OF THE INVENTION

A large number of algorithms designed to find military targets have been published in the literature, using a wide variety of techniques. Representative examples of these algorithms are discussed in the following three ATR survey papers that have been published in the literature, all of which are incorporated herein by reference:

1. J. Ratches et al, "Aided and Automatic Target Recognition Based Upon Sensory Inputs from Image Forming Systems", IEEE Transactions on Pattern Analysis and Machine Intelligence, September 1997.
2. M. Roth, "Survey of Neural Network Technology for Automatic Target Recognition", IEEE Transactions on Neural Networks, March 1990.
3. B. Bhanu, "Automatic Target Recognition: State of the Art Survey", IEEE Transactions on Aerospace and Electronic Systems, July 1986.

While most automatic target detection/recognition (ATD/R) algorithms use much problem specific knowledge to improve performance, the result is an algorithm that is tailored to specific target types, and poses. The approximate range to target is often required, with varying amounts of tolerance.

For example, in some scenarios, it is assumed that the range is known to within a meter from a laser range finder or a digital map. In other scenarios, only the range to the center of field of view and the depression angle is known, so that a flat earth approximation provides a rough estimate. Many algorithms, both model based and learning based, either require accurate range information, or compensate for inaccurate information by attempting to detect targets at a number of different ranges within the tolerance of the range.

Because many such algorithms are quite sensitive to scale, even a modest range tolerance requires that the algorithm attempt to match at a large number of closely spaced scales, driving up both the computational complexity and the false alarm rate. Algorithms have often used view-based neural networks or statistical methods.

SUMMARY OF THE INVENTION

The algorithm of the present invention was designed to address a need for a detection algorithm with wide applicability, which may serve as a pre-screener/detector for a number of applications.

An input image (the image to be searched for vehicles, for example) may be fed to a number of feature extractors. The feature extractors (Straight Edge, Average Edge Strength, Local Variance, Contrast box, Hot spot) process the input image and output images of corresponding feature values, at each of several scales. Brighter locations in the feature images correspond to possible target locations.

It is important for the operation of the later steps that the feature values are monotonic in the likelihood of a target. Each of the feature images is normalized to have zero mean and unit variance. This is also an important step, in that it causes the feature values to be insensitive to differences in contrast settings of the sensor, and to be a measure of difference between a pixel and its background.

A size filter is used as a pre-filter to the Hot Spot and Contrast Box features. The size filter eliminates features in the image that are much bigger than the largest targets, which causes target sized objects to stand out better. The size filter is not used for the other features because it may introduce artifacts that hurt the performance of other features.

After each feature image is calculated and normalized, they are combined into confidence images at each of several scales, using a linear weighting. The Max N box finds some pre-specified number of potential target locations from the confidence images. It finds the brightest pixel in all of the images, marks this pixel location as a target detection, and then zeroes out a target sized neighborhood in all of the confidence images to avoid choosing two detections of the same target. It repeats the search and zeroing until the pre-specified number of detections is obtained.

The algorithm of the present invention is more robust than other available algorithms, in that it performs well on difficult data sets, and does not require any retraining for a new site. Large numbers of algorithms have been published in the literature, but few have been tested on large data sets, and especially data sets that differ markedly from the training sets used to create the algorithm. It has been found by ARL and NVESD that on difficult data sets, this algorithm performs better than any others that are known or available, and nearly the best on data sets that are relatively easy. It shows a great deal of robustness to being tested on data sets that differ drastically from the training imagery.

The algorithm of the present invention also requires much less training data and target information than other algorithms. Moreover, the algorithm of the present invention does not require range information to perform well.

The algorithm is designed to find vehicles in infrared imagery with no range information and no prior training data from the site. Typically, algorithms based on learning methods require data that is taken from a specific site, with performance suffering if the location or meteorological conditions differ from the training data. The algorithm of the present invention is designed to be insensitive to scale, location, clutter type, and meteorological conditions, so that it may be used in a wide variety of situations, rather than be optimized for a specific situation.

The algorithm of the present invention may have a number of uses. The algorithm of the present invention may be used to detect targets in static FLIR images. In addition, the algorithm of the present invention may be used to detect targets in other types of images, including visible, near IR, mid IR, SAR, and multi and hyper spectral. The algorithm may also be used to measure difficulty of image sets by comparing performance on the data sets.

In addition, the algorithm of the present invention may measure comparative utility of different sensor bands for object detection or simulate the performance of an automatic target recognizer (ATR) for computer war game simulations. Furthermore, the algorithm of the present invention may be used to compare detection performance of various infrared sensor designs prior to fabrication, and to find potential false alarms to be used to train a clutter rejecter.

The algorithm of the present invention may also be used to provide an estimate of human performance on a target acquisition task, greatly reducing the cost of performing an experiment. The algorithm may also be used to find anomalies in images—locations that bear further scrutiny. The algorithm may be used to find other kinds and shapes of static objects—doing so only requires modification of the filter shapes and sizes used to calculate each feature image.

Each component of the algorithm may be constructed to be insensitive to scale, which is necessary when inaccurate or no range information is available. Moreover, each component of the algorithm is constructed to be insensitive to spatial shifts. This results in a better centering of targets when all of the components are combined, because the combination doesn't require fusing disjoint peaks.

The algorithm is designed to be robust by using a weak feature fusion algorithm. For this reason, it performs well on difficult data sets.

The proximate motivation for the development of the scale insensitive algorithm was to provide a fast pre-screener for a robotic application for which no range information was available. The algorithm instead attempted to find targets at all ranges between some reasonable minimum, determined from operational requirements, and the maximum effective range of the sensor.

Another motivation was to develop an algorithm that could be applied to a wide variety of image sets and sensor types, which required it to perform consistently on new data, without the severe degradation in performance that commonly occurs with learning algorithms, such as neural networks and PCA based methods, that have been trained on a limited variety of sensor types, terrain types, and environmental conditions. While it is recognized that with a suitable training set, learning algorithms will often perform better than other methods, this typically requires a large, and expensive, training set, which is sometimes not feasible.

DETAILED DESCRIPTION OF THE INVENTION

Figure 1:
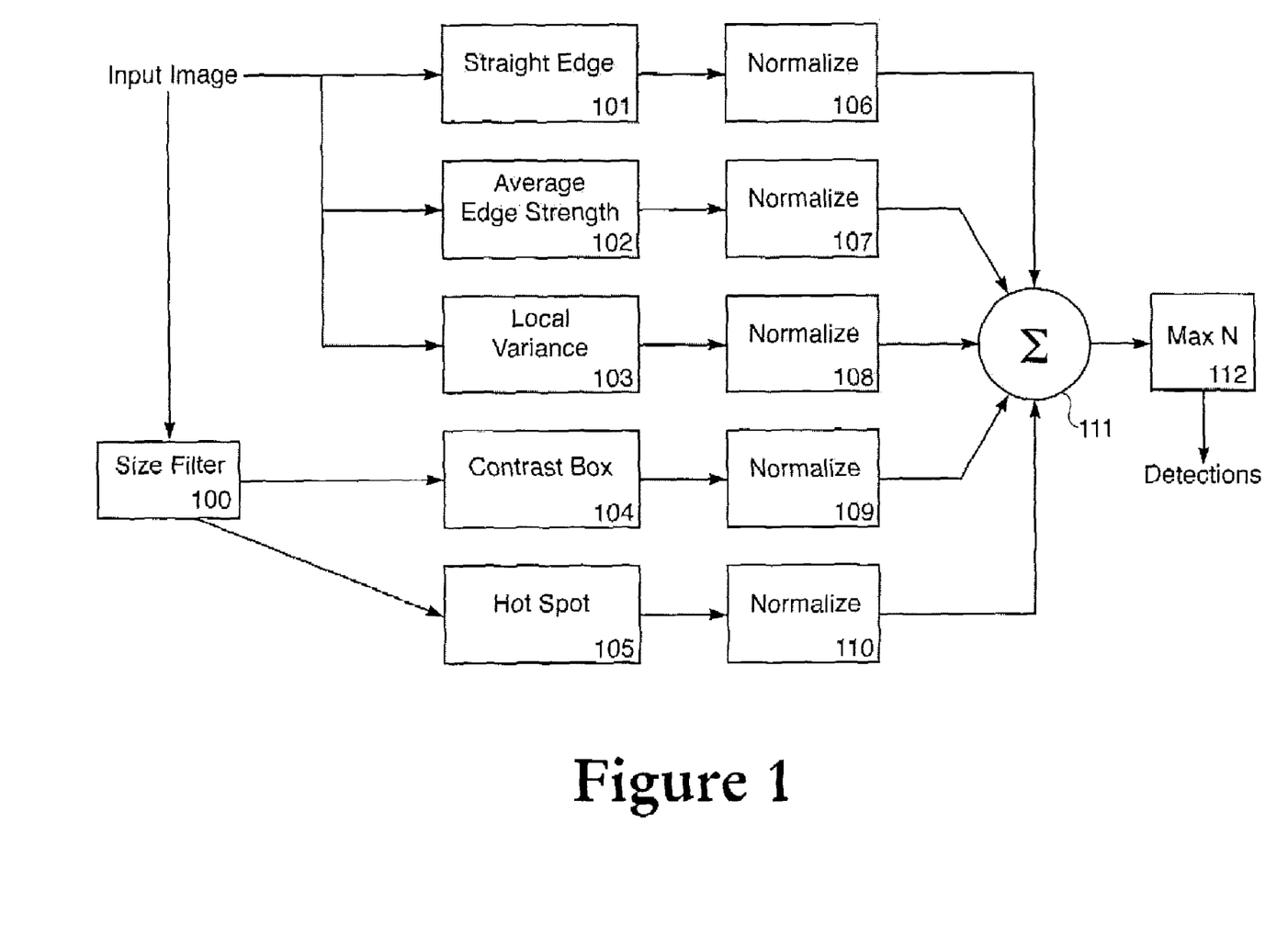
FIG. 1 is a flowchart of the detection algorithm of the present invention.

Referring now to FIG. 1, A flowchart of the detection algorithm is illustrated. An input image (the image to be searched for targets such as vehicles and the like) is fed to a number of feature extractors 101-105. The feature extractors (Straight Edge 101, Average Edge Strength 102, Local Variance 103, Contrast Box 104, and Hot Spot 105) process the input image and output images of corresponding feature values, at each of several scales. Brighter locations in the feature images correspond to possible target locations.

It is important for the operation of the later steps that the feature values are monotonic in the likelihood of a target. Each of the feature images is normalized to have zero mean and unit variance. This is also an important step, in that it causes the feature values to be insensitive to differences in contrast settings of the sensor, and to be a measure of difference between a pixel and its background.

Size filter 100 is used as a pre-filter to Hot Spot 105 and Contrast Box 104 features. Size filter 100 eliminates features in an image that are much bigger than the largest targets, which causes target sized objects to stand out better. For example, when viewing a ground image, warm parking lot surfaces or plowed fields may stand out in infrared. However, these objects are much larger than the desired target objects. By filtering out such large objects, the remaining target-sized objects stand out. The size filter may not used for the other features because it may introduce artifacts that hurt the performance of other features.

Operation of the present invention of FIG. 1 will now be described in the context of sample data as illustrated in FIGS. 2-8. This sample data used in training and testing this system includes the April 1992 Comanche FLIR collection at Ft. Hunter-Ligget, California. This dataset consists of 1225 images, each 720 by 480 pixels. Each image has a field of view of approximately 1.75 degrees$^2$.

Each of the images may contain one or two targets in a hilly, wooded background. Ground truth was available which provided target centroid, range to target, target type, target aspect, range to center of field of view, and the depression angle. The target centroid and range to target were used to score the algorithm, as described in the experimental results section, but none of the target specific information was used in the testing process. The algorithm only assumes that the vertical and horizontal fields of view and the number of pixels horizontally and vertically is known. The only range information used is the operational minimum range and the maximum effective range of the sensor.

Each of the features boxes 101-105 is calculated for every pixel in the image. As more complex features are added in the future, it may be beneficial to calculate some of the features only at those locations for which the other feature values are high. While each of the features assumes knowledge of the range to determine approximate target size, these features are not highly range sensitive. The algorithm calculates each of these features at coarsely sampled ranges between the minimum and maximum allowed range. Features 101-105 will be described as follows.

Each of the features was selected based on intuition, with the criteria that they be monotonic and computationally simple. The features are described in decreasing order of importance.

Hot Spot (Maximum Grey Level) 105 is the highest grey level within a roughly target sized rectangle centered on the pixel. Hot Spot 105 was selected because in many FLIR images of vehicles, there are a few pixels that are significantly hotter than the rest of the target or the background.

These pixels are usually on the engine, the exhaust manifold or the exhaust pipe. However, such hotter pixels may not represent the desired "center" of a target. For example, in a troop carrier, the hottest pixels may represent the location of an engine or exhaust pipe. However the desired target (the troops) may be located in the back of the troop carrier, some distance away from the engine.

$$F_{i,j}^0 = \max_{(k,l) \in N_{in}(i,j)} f(k,l)$$

where f(k,l) is the grey level value of the pixel in the kth row and lth column, $N_{in}(i,j)$ is the neighborhood of the pixel (i,j), defined as a rectangle whose width is the length of the longest vehicle in the target set, and whose height is the height of the tallest vehicle in the target set. For the applications that we have considered, the width is 7 meters and the height 3 meters.

Contrastbox 104 measures the average grey level over a target sized region, and compares it to (and subtracts it from) the grey level of the local background. Contrastbox 104 was selected because many pixels that are not on the engine or on other particularly hot portions of the target are still somewhat warmer than the natural background. This feature has been used by a large number of authors.

$$F_{i,j}^1 = \frac{1}{n_{in}} \sum_{(k,l) \in N_{in}(i,j)} f(k,l) - \frac{1}{n_{out}} \sum_{(k,l) \in N_{out}(i,j)} f(K,l)$$

where $n_{out}$ is the number of pixels in Nout(i,j), $n_{in}$ is the number of pixels in $N_{in}(i,j)$, $N_{in}(i,j)$ is the target sized neighborhood defined above, and the neighborhood $N_{out}(i,j)$ contains all of the pixels in a larger rectangle around (i,j), except those pixels that are in $N_{in}(i,j)$.

Average Edge (or Gradient) Strength 102 was selected because man made objects tend to show sharper internal detail than natural objects, even when the average intensity is similar. To prevent large regions of background which show higher than normal variation from showing a high value for this feature, the average gradient strength of the local background is subtracted from the average gradient strength of the target sized region. The feature is calculated as:

$$F_{i,j}^2 = \frac{1}{n_{in}} \sum_{(k,l) \in N_{in}(i,j)} G_{in}(i,j) - \frac{1}{n_{out}} \sum_{(k,l) \in N_{out}(i,j)} G_{out}(i,j)$$

where:

$$G_{in}(i,j) = G_{in}^h(i,j) + G_{in}^v(i,j)$$

$$G_{in}^h(i,j) = |f(i,j) - f(i,j+1)|$$

$$G_{in}^v(i,j) = |f(i,j) - f(i+1,j)|$$

and $G_{out}(i,j)$ is defined similarly.

Local Variance (or Variation) 103 was selected because manmade object often show greater variation in temperature than natural objects. This feature merely determines the average absolute difference between each pixel and the mean of the internal region, and compares it to the same measurement for a local background region. The feature is calculated as:

$$F_{i,j}^3 = \frac{L_{in}(i,j)}{n_{in}} - \frac{L_{out}(i,j)}{n_{out}}$$

and $$L_{in}(i,j) = \sum_{(k,l) \in N_{in}(i,j)} |f(k,l) - \mu_{in}(i,j)|$$

where $$\mu_{in}(i,j) = \frac{1}{n_{in}} \sum_{(k,l) \in N_{in}(i,j)} f(k,l)$$

and $L_{out}(i,j)$ and $\mu_{in}(i,j)$ are defined similarly.

Straight Edge 101 was selected because manmade objects often display straighter temperature gradients than natural objects, especially in the near vertical and horizontal directions. This feature measures the strength of a straight edge that extends for several pixels, and then determines if the edge values in a target sized region differ from the local background. The feature is calculated as:

$$F_{i,j}^4 = \frac{1}{n_{in}} \sum_{(k,l) \in N_{in}(i,j)} H_{in}(i,j) - \frac{1}{n_{out}} \sum_{(k,l) \in N_{out}(i,j)} H_{out}(i,j)$$

where $$H_{in}(i,j) = H_{in}^h(i,j) + H_{in}^v(i,j)$$

$$H_{in}(i,j) = H_{in}^h(i,j) + H_{in}^v(i,j)$$

$$H_{in}^h(i,j) = \sum_{|k-i|<1} |f(k,j) - f(k,j+1)|$$

$$H_{in}^v(i,j) = \sum_{|k-i|<1} |f(i,k) - f(i+1,k)|$$

and $H_{out}(i,j)$ is defined similarly. The parameter 1 is a function of field of view of the system, target range, and target size. If the sensor or target is significantly tilted, the functions may be suitably modified to measure edges in other directions.

A large number of features were programmed, and the value of these features were calculated over a large number of randomly selected pixels in the images of the training set. The feature values were also calculated at the ground truth location of the targets. Histograms were computed for each of the features for both the target and background pixels, and a measure of separability was calculated.

The correlation of the features was also calculated, to avoid choosing several features that are similar. Some of the features were highly correlated, which was expected because one of the purposes of the training was to determine which of similar features provided the greatest separability. For example, a number of contrast features were used, which normalized the target and background values by local standard deviation of the background, or of the target, or neither. Similarly, a number of gradient strength feature were calculated. The feature pruning process was ad hoc, so it would be reasonable to expect that performance improvement could be obtained by a more rigorous approach.

The output of each of the feature boxes is normalized in corresponding normalization boxes 106-110 as follows.

Each feature is normalized across the image, so that the feature value at each pixel represents the number of standard deviations that the pixel stands apart from the values for the same feature across the image. Thus the normalized feature image for the mth feature is normalized as:

$$F_{i,j}^{m,N} = \frac{F_{i,j}^m - \mu_m}{\sigma_m}$$

where $$\mu_m = \frac{1}{M} \sum_{all(k,l)} F_{k,l}^m$$

and $$\sigma_m = \frac{1}{M} \sum_{all(k,l)} (F_{k,l}^m - \mu_m)^2$$

After normalization, the features, each of which is calculated for each pixel, are linearly combined into a confidence image in summation block 111:

$$G_{i,j} \sum_{m=0}^{3} \omega_m F_{i,j}^{m,N}$$

where the feature weights $\omega_m$ are determined using an algorithm not described here. The confidence value of each pixel is mapped by a scaling function $S: \Re \to [0,1]$, as $$S(G_{i,j}) = 1 - e^{\alpha G_{i,j}}$$

where $\alpha$ is a constant.

This scaling does not change the relative value of the various pixels, it merely scales them to the interval [0,1] for convenience. Confidence numbers are often limited to this interval because they are estimates of the a posteriori probability. While this is not true for our algorithm, using this interval is convenient for evaluators.

In Max N block 112, detection locations may be determined from the scaled confidence image. Pixel value(s) with the maximum confidence value may be chosen. Then a target size neighborhood around the image may be set to zero, such that the search for subsequent detections will not choose a pixel location corresponding to the same target. The process is then repeated for the fixed number of detections selected before the algorithm was run.

Thus, a number of potential targets may be pulled out of the data from summation block 111. The output of summation block 111 may be a confidence values for each pixel location or locations within a target area. Man N block 112 converts this to a list of potential targets comprising pixel locations and confidence values. Locations with confidence values below predetermined thresholds may be discarded. Similarly, adjacent pixels representing the same target may be combined into one potential target location. In this manner, a list of potential targets may be identified and presented to an operator, who may in response provide instructions to fire or not to fire on a target.

It should be noted that although the present invention is disclosed in terms of military applications, the use of the target identification system of the present invention may have other military or non-military uses. For example, the target identification system of the present invention may be used to identify objects in a scene for industrial robotics applications, or to locate and find objects or persons using infrared technology (e.g., search and rescue operations). Similarly, the present invention may have uses for Police and other applications where infrared or other types of imagery are used to track individuals and vehicles.

Figure 2:
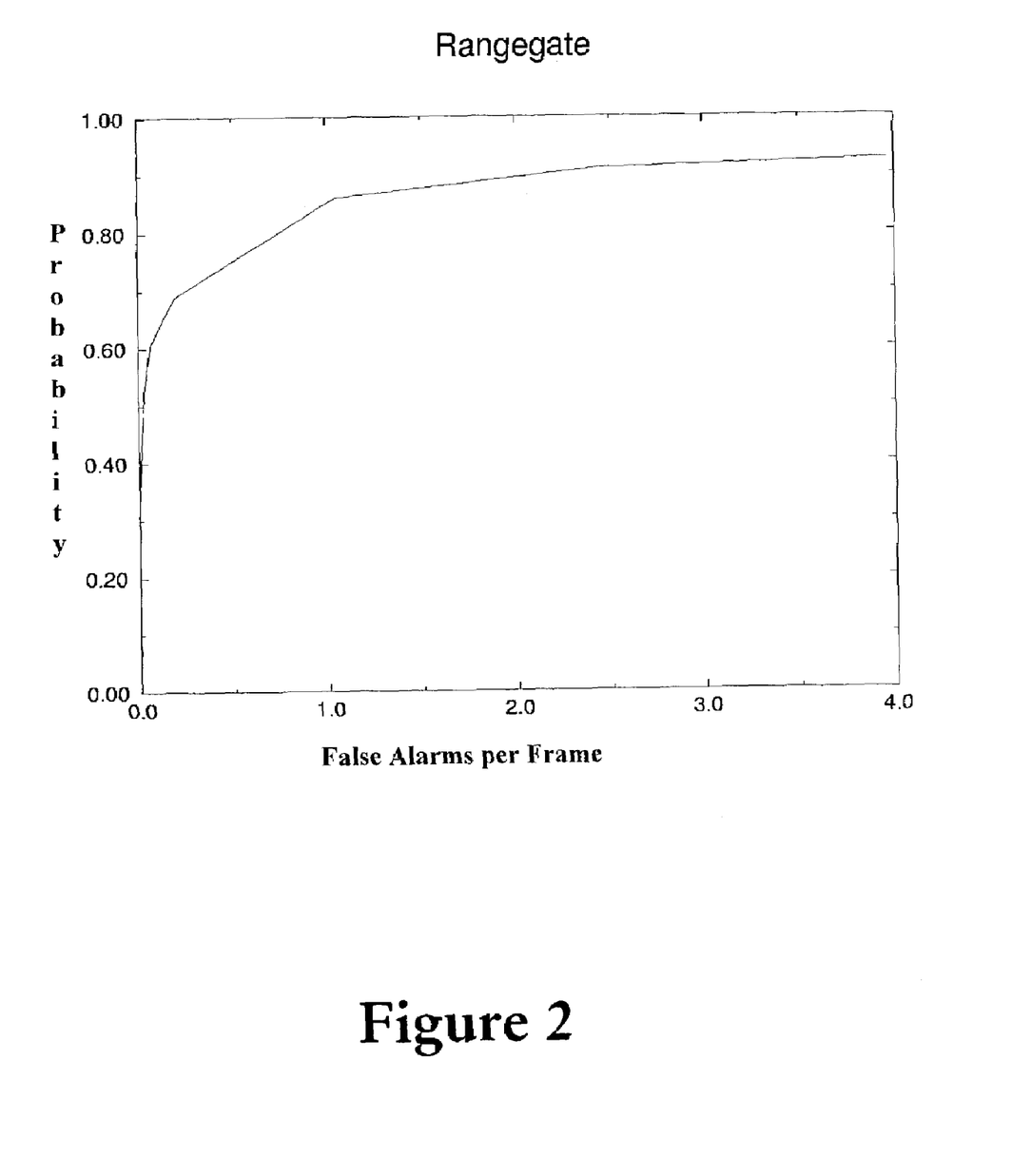
FIG. 2 is a graph of an ROC curve for test results on the Hunter-Liggett April 1992 ROT database.

Experimental Results—The training results on the Hunter-Liggett April 1992 ROI database are illustrated in the ROC curve in FIG. 2. Test results on the February July ROI database collected at Yuma Proving Grounds is illustrated in FIG. 3 and for Greyling August 1992 ROI database in FIG. 4

Figure 3:
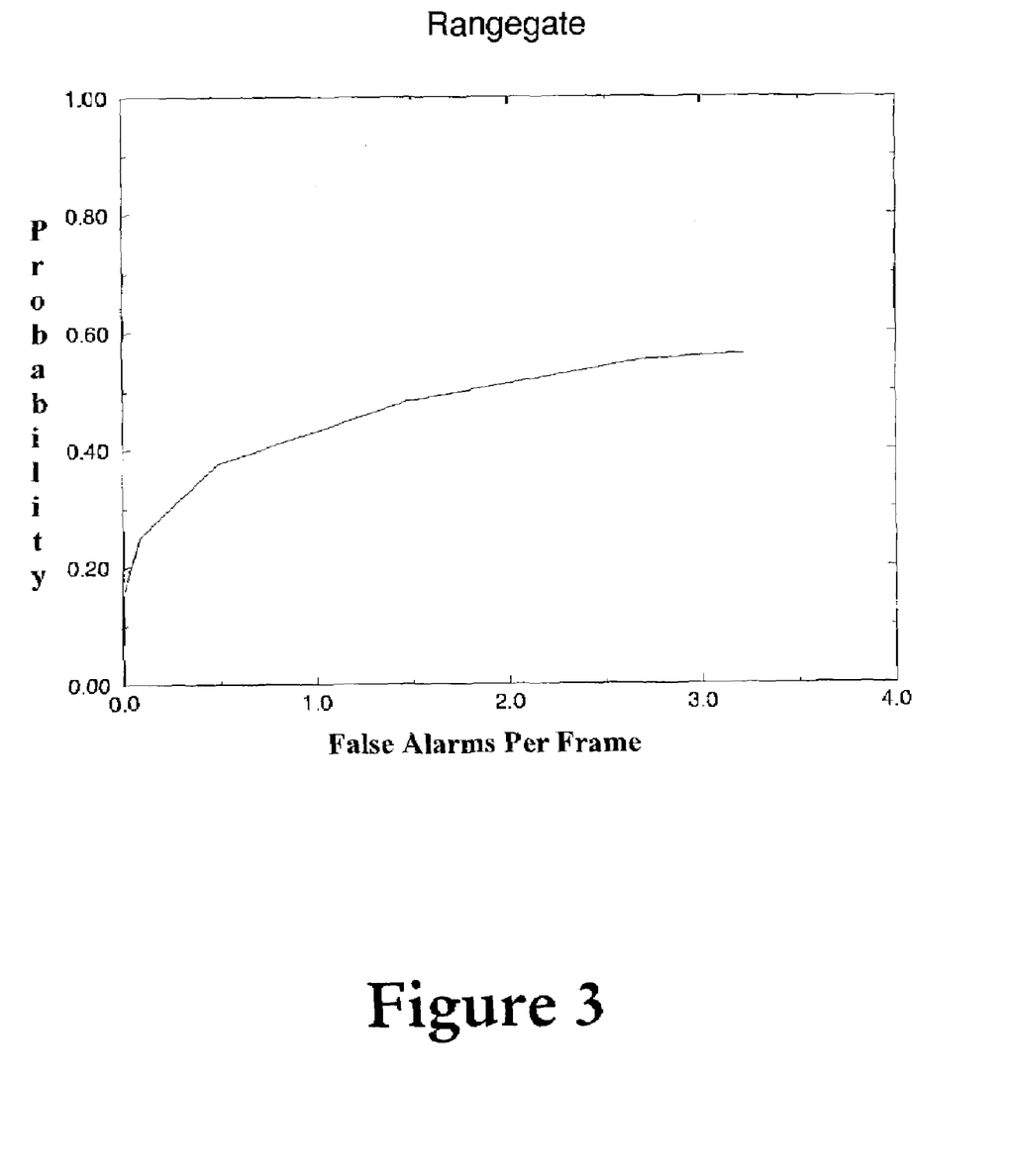
FIG. 3 is a graph of an ROC curve for test results on the February July ROT database collected at Yuma Proving Grounds.
Figure 4:
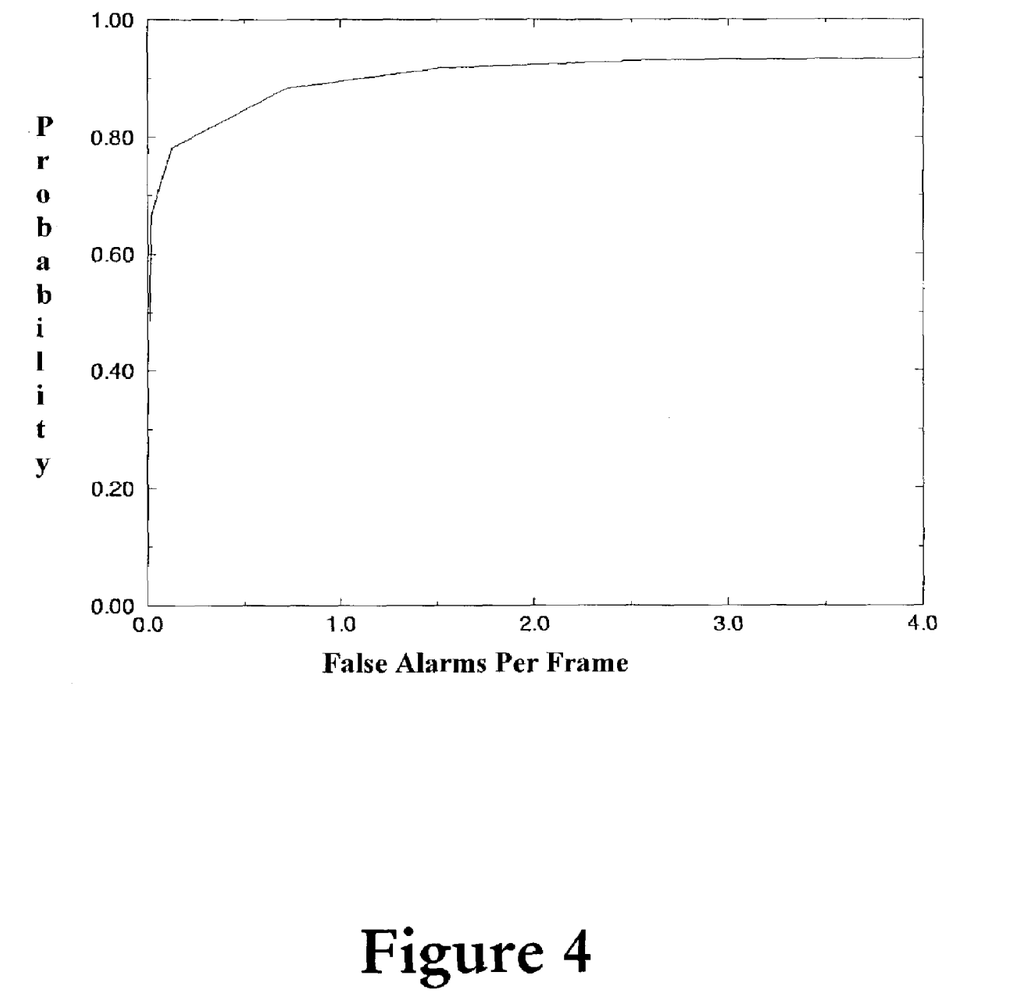
FIG. 4 is a graph of an ROC curve for test results for Greyling August 1992 ROT database.

In each of the FIGS. 2-4, the horizontal axis represents number of false alarms per minute, where the vertical axis represents target detection probability.

The Yuma test data is much more difficult, because it was taken in the desert in July, so many locations in the image have a higher apparent temperature than the targets. The data from Greyling, Mich. is significantly easier because the temperatures are more mild, and is comparable in difficulty to the training data. Note that no training data was used from anywhere but Hunter-Liggett, so the results suggest that the algorithm is not sensitive to the training background. This is not surprising given the simplicity of the algorithm, but sensitivity is common to many learning algorithms.

Figure 5:
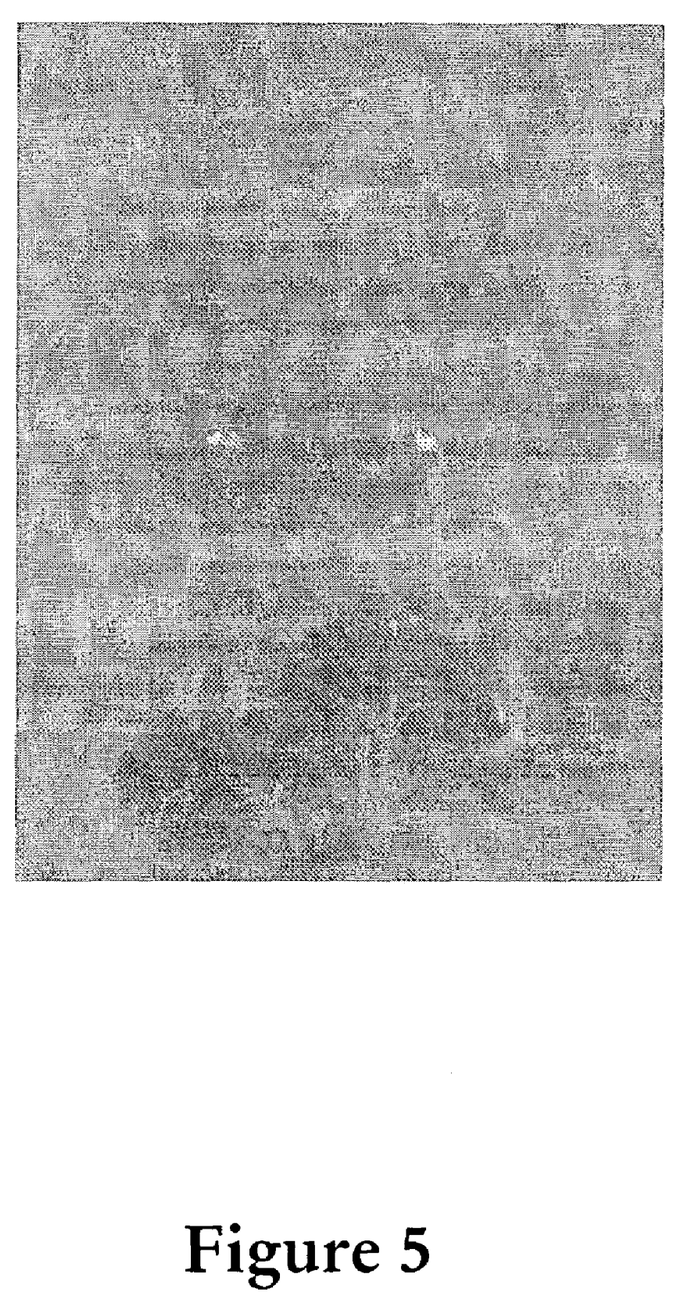
FIG. 5 is an illustration of a sample image.
Figure 6:
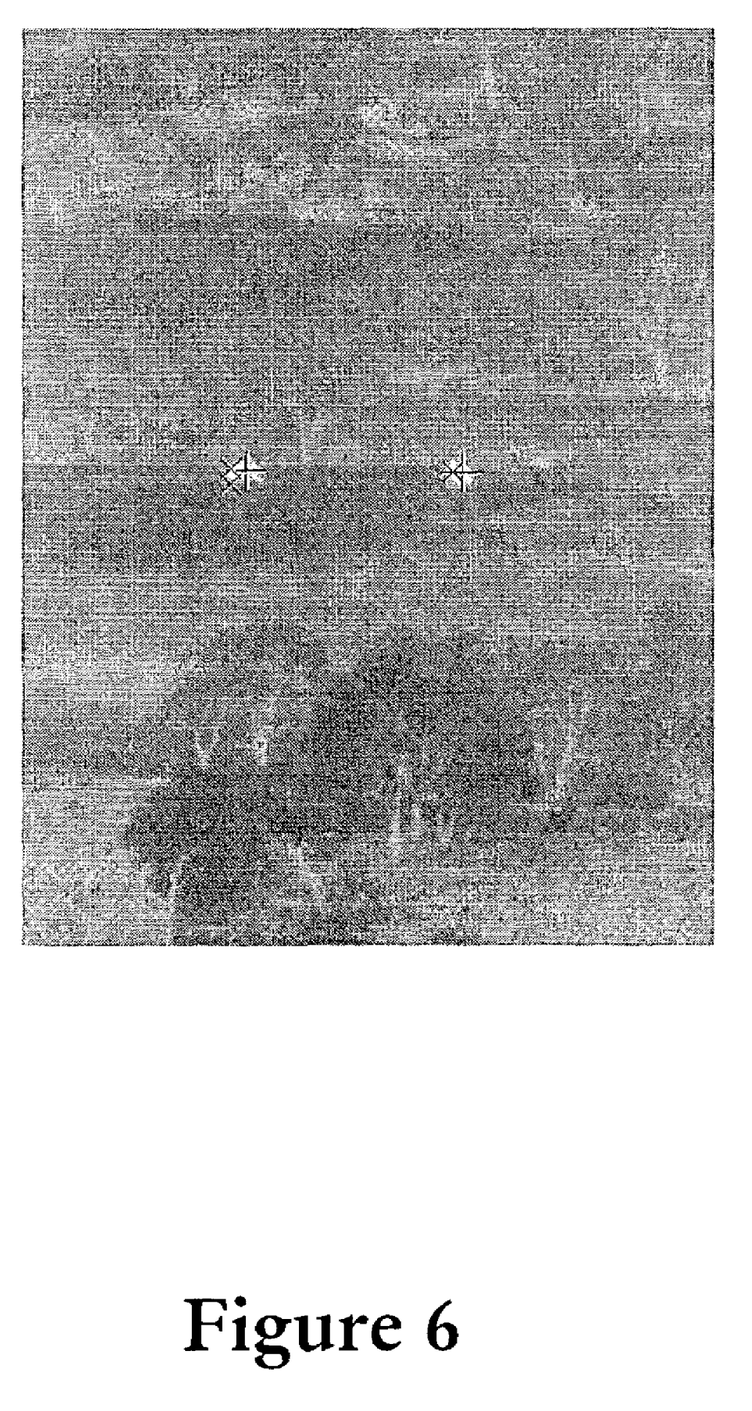
FIG. 6 is an illustration of the results of the algorithm on the sample image of FIG. 5, where crosses denotes the ground truth targets, and X's denote the detections on the targets.

FIGS. 5 and 6 illustrate a sample image and the results of the algorithm on the image. The crosses indicated in FIG. 6 denote the ground truth targets (actual target locations) whereas the X's denote the detections on the targets. Detections are designated hits if the detection center falls anywhere on the actual target, and are designated false alarms otherwise. The top three detections, ranked by confidence number, are designated on the image. The top two detections are hits, while the third falls near the target and is designated a false alarm.

Figure 7:
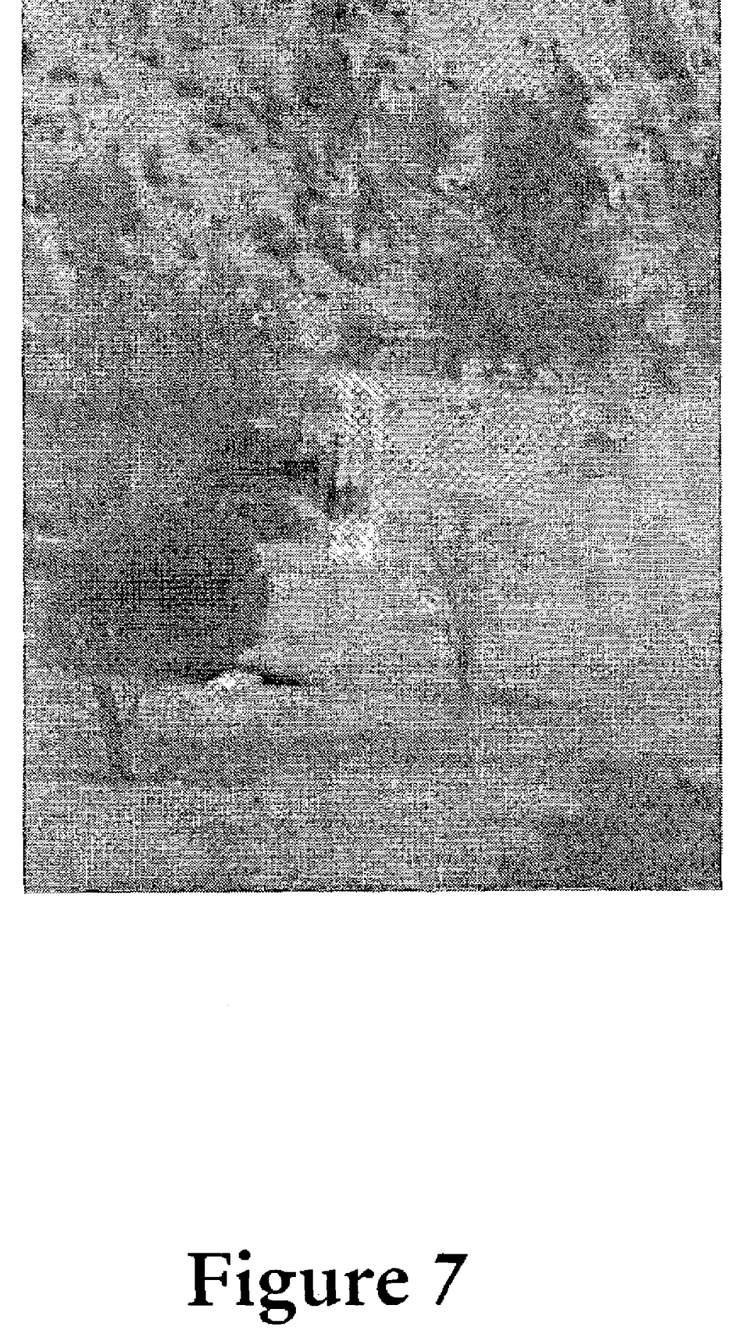
FIG. 7 is an illustration of a somewhat more difficult sample image.
Figure 8:
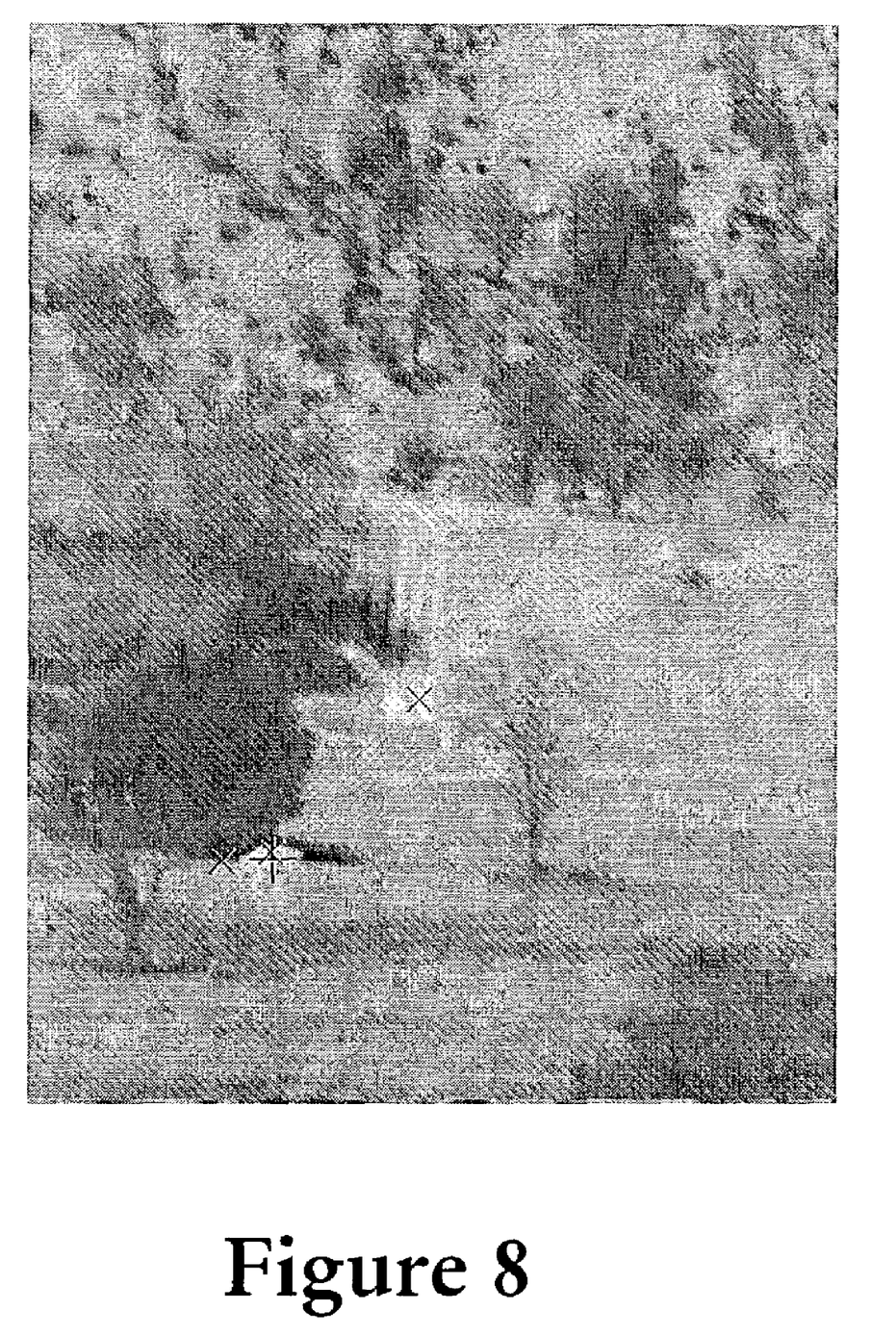
FIG. 8 is an illustration of the results of the algorithm on the sample image of FIG. 7.

FIGS. 7 and 8 illustrate another, somewhat more difficult, image and associated algorithm results. Again, in FIG. 8, the crosses indicate actual targets, whereas the x's indicate detections on targets. The highest detection in FIG. 8 falls on a target in the bottom left of the image, while the second highest detection is a false alarm near the center of the image. The location looks like a possible target, however it is merely a warm spot on the dirt road.

The algorithm of the present invention, with relatively minor modifications, has been used by the Demo III unmanned ground vehicle (UGV) program, to reduce the amount of imagery that must be transmitted via radiolink to a human user. The algorithm of the present invention may also be used by the Sensors for UGV program at NVESD, to prescreen uncooled FLIR imagery and indicate potential targets which should be looked at more closely with an active laser sensor. The algorithm of the present invention has also been used as a synthetic image validation tool, by measuring the performance of the algorithm in comparison to real imagery.

Additional feature boxes may be added to the present invention without departing from the spirit and scope thereof. A more systematic evaluation of potential features may be applied to the invention. An improved classification scheme may be incorporated which allows useful features which rarely appear to be incorporated.

For example, in a small minority of FLIR images of targets, a windshield will reflect cold sky, causing a few pixels to be extremely dark. The invention as disclosed above is not set up to incorporate such features, because the weighting would be quite low since the feature is seldom useful. However, such a feature could be added for specific applications or be implemented automatically in certain situations.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A target identification system for identifying targets in an input image, said system comprising:
   a plurality of feature extractors, each for extracting a particular feature from an image and producing a resulting modified image;
   a plurality of normalizers, each coupled to a corresponding one of the plurality of feature extractors, for normalizing the corresponding modified image across the image, such that the feature value at each pixel of the modified image represents the number of standard deviations that the pixel stands apart from values for the same feature across the image, each of said plurality of normalizers outputting a corresponding normalized modified image;
   means for combining the plurality of normalized modified images to produce a combined image having a plurality of confidence values for a plurality of pixels within the image; and
   means for extracting a list of potential targets from the combined image, each of the list of potential targets having an associated confidence value.

2. The target identification system of claim 1, wherein said plurality of feature extractors includes:
   a hot spot extractor for detecting the highest grey level within a roughly target-sized rectangle centered on a pixel.

3. The target identification system of claim 2, wherein said hot spot extractor processes the input image according to the following equation:

$$F_{i,j}^0 = \max_{(k,l) \in N_{in}(i,j)} f(k,l)$$

where $f(k,l)$ is the grey level value of the pixel in the kth row and lth column, $N_{in}(i,j)$ is the neighborhood of the pixel $(i,j)$, defined as a rectangle whose width is the length of the longest vehicle in the target set, and whose height is the height of the tallest vehicle in the target set.

4. The target identification system of claim 1, wherein said plurality of feature extractors includes:
   a contrastbox for measuring average grey level over a target sized regions and comparing the average grey level to grey level of a local background.

5. The target identification system of claim 4, wherein said contrastbox processes the input image according to the following equation:

$$F_{i,j}^1 = \frac{1}{n_{in}} \sum_{(k,l) \in N_{in}(i,j)} f(k,l) - \frac{1}{n_{out}} \sum_{(k,l) \in N_{out}(i,j)} f(K,l)$$

where $n_{out}$ is the number of pixels in $N_{out}(i,j)$, $n_{in}$ is the number of pixels in $N_{in}(i,j)$, $N_{in}(i,j)$ is a target-sized neighborhood, and neighborhood $N_{out}(i,j)$ contains all pixels in a larger rectangle around $(i,j)$, except those pixels that are in $N_{in}(i,j)$.

6. The target identification system of claim 1, wherein said plurality of feature extractors includes:
   average edge strength extractor, for subtracting the average gradient strength of local background from average gradient strength of a target-sized region.

7. The target identification system of claim 6, wherein said average edge strength extractor processes the input image according to the following equations:

$$F_{i,j}^2 = \frac{1}{n_{in}} \sum_{(k,l) \in N_{in}(i,j)} G_{in}(i,j) - \frac{1}{n_{out}} \sum_{(k,l) \in N_{out}(i,j)} G_{out}(i,j)$$

where:

$G_{in}(i,j) = G_{in}^h(i,j) + G_{in}^v(i,j)$ $G_{in}^h(i,j) = |f(i,j) - f(i,j+1)|$ $G_{in}^v(i,j) = |f(i,j) - f(i+1,j)|$ and $G_{out}(i,j)$ is defined using the same equations.

8. The target identification system of claim 1, wherein said plurality of feature extractors includes:
   a local variance extractor for determining average absolute difference between each pixel and a mean of an internal region, and comparing it to the same measurement for a local background region.

9. The target identification system of claim 8, wherein said local variance extractor processes the input image according to the following equations:

$$F_{i,j}^3 = \frac{L_{in}(i,j)}{n_{in}} - \frac{L_{out}(i,j)}{n_{out}}$$

and $$L_{in}(i,j) = \sum_{(k,l) \in N_{in}(i,j)} |f(k,l) - \mu_{in}(i,j)|$$

where $$\mu_{in}(i,j) = \frac{1}{n_{in}} \sum_{(k,l) \in N_{in}(i,j)} f(k,l)$$

and $L_{out}(i,j)$ and $\mu_{in}(i,j)$ are defined using the same equations.

10. The target identification system of claim 1, wherein said plurality of feature extractors includes:
    a straight edge detector for measuring strength of a straight edge extending for several pixels, and then determining if the straight edge values in a target-sized region differ from local background.

11. The target identification system of claim 10, wherein said straight edge detector processes the input image according to the following equations:

$$F_{i,j}^4 = \frac{1}{n_{in}} \sum_{(k,l) \in N_{in}(i,j)} H_{in}(i,j) - \frac{1}{n_{out}} \sum_{(k,l) \in N_{out}(i,j)} H_{out}(i,j)$$

where $$H_{in}(i,j) = H_{in}^h(i,j) + H_{in}^v(i,j)$$

-continued $$H_{in}^h(i, j) = \sum_{|k-i|<l} |f(k, j) - f(k, j+1)|$$

$$H_{in}^v(i, j) = \sum_{|k-i|<l} |f(i, k) - f(i+1, k)|$$

and $G_{out}(i,j)$ is defined using the same equations, parameter l is a function of field of view of the system, target range, and target size.

12. The target identification system of claim 1, further comprising:
at least one size filter used as a prefilter to a selected at least one of the plurality of feature extractors, said at least one size filter eliminating features in an image which are much bigger than the largest targets, causing target sized objects to stand out better.

13. The target identification system of claim 1, wherein each of said plurality of normalizers each feature across the image, such that the feature value at each pixel represents the number of standard deviations that the pixel stands apart from the values for the same feature across the image, wherein the normalized feature image for the mth feature is normalized as:

$$F_{i,j}^{m,N} = \frac{F_{i,j}^m - \mu_m}{\sigma_m}$$

here $$\mu_m = \frac{1}{M} \sum_{all(k,l)} F_{k,l}^m \text{ and } \sigma_m = \frac{1}{M} \sum_{all(k,l)} (F_{k,l}^m - \mu_m)^2.$$

14. The target identification system of claim 1, wherein said means for combining combines the normalized modified images according to the following equation:

$$G_{i,j} = \sum_{m=0}^{3} \omega_m F_{i,j}^{m,N}$$

wherein the confidence value of each pixel is mapped by a scaling function $S: \Re[0,1]$, as $$S(G_{i,j}) = 1 - e^{G_{i,j}}$$

where $\propto$ is a constant.

15. The target identification system of claim 1, wherein the means for extracting selects at least one pixel value with maximum confidence value, sets a target-size neighborhood around the image may be set to zero, such that the search for subsequent detections will not choose a pixel location corresponding to the same target.

16. A method for identifying targets in an input image, said method comprising:
extracting, using a plurality of feature extractors, a corresponding particular feature from an image and producing a resulting modified image,
normalizing, using a plurality of normalizers, each coupled to a corresponding one of the plurality of feature extractors, the corresponding modified image across the image, such that the feature value at each pixel of the modified image represents the number of standard deviations that the pixel stands apart from values for the same feature across the image, each of said plurality of normalizers outputting a corresponding normalized modified image,
combining the plurality of normalized modified images to produce a combined image having a plurality of confidence values for a plurality of pixels within the image, and
extracting a list of potential targets from the combined image, each of the list of potential targets having an associated confidence value.

17. The method of claim 16, wherein said step of extracting includes the step of:
detecting the highest grey level within a roughly target-sized rectangle centered on a pixel.

18. The method of claim 17, wherein said step of detecting the highest grey level within a roughly target-sized rectangle centered on a pixel, comprises the step of processing the input image according to the following equation:

$$F_{i,j}^0 = \max_{(k,l)\in N_{in}(i,j)} f(k,l)$$

where f(k,l) is the grey level value of the pixel in the kth row mad lth column, $N_{in}(i,j)$ is the neighborhood of the pixel (i,j), defined as a rectangle whose width is the length of the longest vehicle in the target set, and whose height is the height of the tallest vehicle in the target set.

19. The method of claim 16, wherein said step of extracting includes the steps of:
measuring average grey level over a target sized region, and comparing the average grey level to grey level of a local background.

20. The method of claim 19, wherein said step of measuring average grey level over a target sized region, and comparing the average grey level to grey level of a local background comprises the step of processing the input image according to the following equation:

$$F_{i,j}^1 = \frac{1}{n_{in}} \sum_{(k,l)\in N_{in}(i,j)} f(k,l) - \frac{1}{n_{out}} \sum_{(k,l)\in N_{out}(i,j)} f(K,l)$$

where $n_{out}$ is the number of pixels in Nout(i,j), $n_{in}$ is the number of pixels in $N_{in}(i,j)$, $N_{in}(i,j)$ is a target-sized neighborhood, and neighborhood $N_{out}(i,j)$ contains all pixels in a larger rectangle around (i,j), except those pixels that are in $N_{in}(i,j)$.

21. The method of claim 16, wherein said step of extracting includes the step of
subtracting the average gradient strength of local background from average gradient strength of a target-sized region.

22. The method of claim 21, wherein said step of subtracting the average gradient strength of local background from average gradient strength of a target-sized region comprises the step of processing the input image according to the the following equations:

$$F_{i,j}^2 = \frac{1}{n_{in}} \sum_{(k,l)\in N_{in}(i,j)} G_{in}(i,j) - \frac{1}{n_{out}} \sum_{(k,l)\in N_{out}(i,j)} G_{out}(i,j)$$

where:

$$G_{in}(i,j) = G_{in}^h(i,j) + G_{in}^v(i,j)$$

$G_{in}^h(i,j)=|f(i,j)-f(i,j+1)|$ $G_{in}^v(i,j)=|f(i,j)-f(i+1,j)|$ and $G_{out}(i,j)$ is defined using the same equations.

23. The method of claim 16, wherein said step of extracting includes the steps of:
   determining average absolute difference between each pixel and a mean of an internal region, and comparing it to the same measurement for a local background region.

24. The method of claim 23, wherein said step of determining average absolute difference between each pixel and a mean of an internal region, and comparing it to the same measurement for a local background region comprises the steps of processing the input image according to the following equations:

$$F_{i,j}^3 = \frac{L_{in}(i,j)}{n_{in}} - \frac{L_{out}(i,j)}{n_{out}} \text{ and}$$

$$L_{in}(i,j) = \sum_{(k,l) \in N_{in}(i,j)} |f(k,l) - \mu_{in}(i,j)|$$

where $$\mu_{in}(i,j) = \frac{1}{n_{in}} \sum_{(k,l) \in N_{in}(i,j)} f(k,l)$$

and $L_{out}(i,j)$ and $\mu_{in}(i,j)$ are defined using the same equations.

25. The method of claim 16, wherein said step of extracting includes the steps of:
   measuring strength of a straight edge extending for several pixels, and then determining if the straight edge values in a target-sized region differ from local background.

26. The method of claim 25, wherein said step of measuring strength of a straight edge extending for several pixels, and then determining if the straight edge values in a target-sized region differ from local background comprises the steps of processing the input image according to the following equations:

$$F_{i,j}^4 = \frac{1}{n_{in}} \sum_{(k,l) \in N_{in}(i,j)} H_{in}(i,j) - \frac{1}{n_{out}} \sum_{(k,l) \in N_{out}(i,j)} H_{out}(i,j)$$

where $$H_{in}(i,j) = H_{in}^h(i,j) + H_{in}^v(i,j)$$

$$H_{in}^h(i,j) = \sum_{|k-i|<l} |f(k,j) - f(k,j+1)|$$

-continued $$H_{in}^v(i,j) = \sum_{|k-i|<l} |f(i,k) - f(i+1,k)|$$

and $G_{out}(i,j)$ is defined using the same equations, parameter l is a function of field of view of the system, target range, and target size.

27. The method of claim 16, further comprising the step of:
   prefiltering, in at least one size filter, a selected at least one of the plurality of feature extractors, said step of prefiltering eliminating features in an image which are much bigger than the largest targets, causing target sized objects to stand out better.

28. The method of claim 16, wherein said step of normalizing includes the step of normalizing each feature across the image, such that the feature value at each pixel represents the number of standard deviations that the pixel stands apart from the values for the same feature across the image, wherein the normalized feature image for the mth feature is normalized as:

$$F_{i,j}^{m,N} = \frac{F_{i,j}^m - \mu_m}{\sigma_m}$$

where $$\mu_m = \frac{1}{M} \sum_{all(k,l)} F_{k,l}^m \text{ and } \sigma_m = \frac{1}{M} \sum_{all(k,l)} (F_{k,l}^m - \mu_m)^2.$$

29. The method of claim 16, wherein said the step of combining combines the normalized modified images according to the following equation:

$$G_{i,j} = \sum_{m=0}^{3} \omega_m F_{i,j}^{m,N}$$

wherein the confidence value of each pixel is mapped by a scaling function $S: \Re \rightarrow [0,1]$, as $S(G_{i,j}) = 1 - e^{\alpha G_{i,j}}$ where $\alpha$ is a constant.

30. The method of claim 16, wherein the means for extracting selects at least one pixel value with maximum confidence value, sets a target-size neighborhood around the image may be set to zero, such that the search for subsequent detections will not choose a pixel location corresponding to the same target.

* * * * *